Oct. 6, 1936.    T. T. RICHARDS ET AL    2,056,366
POLE TOP FIXTURE
Filed Jan. 20, 1934    3 Sheets-Sheet 1

INVENTORS
Thomas T. Richards,
George McD. Johns,
Edsel K. Smith.
BY Ralph ...
ATTORNEY

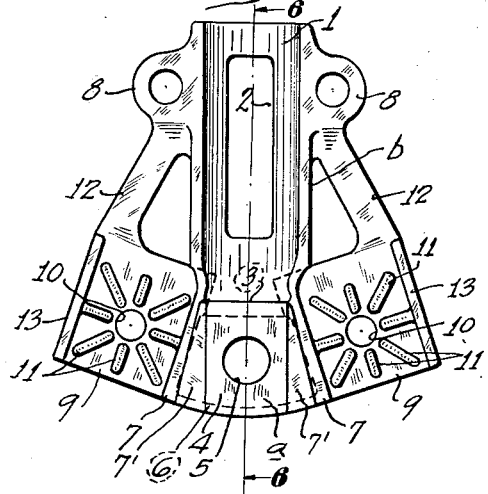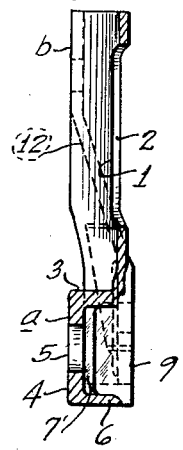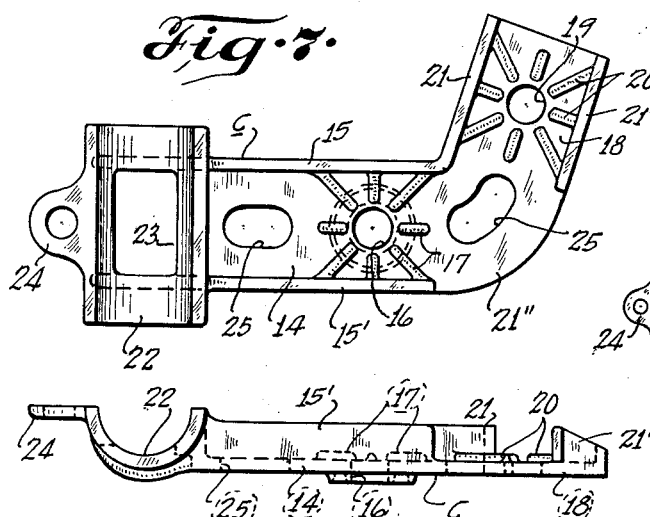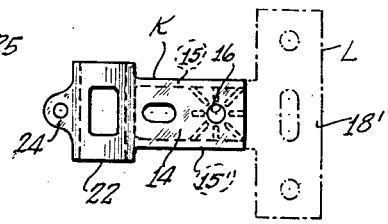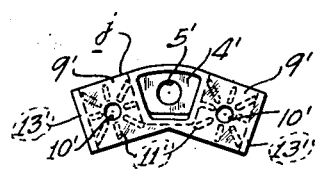

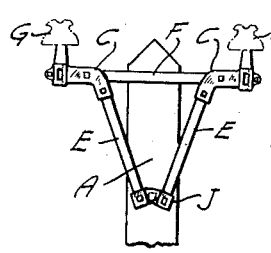
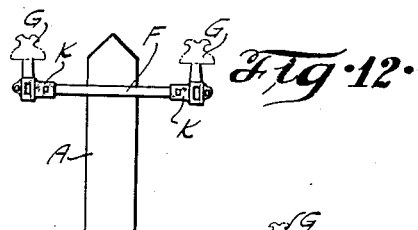
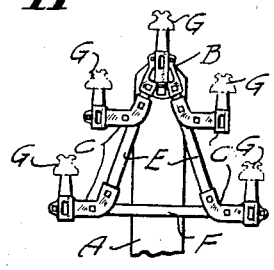
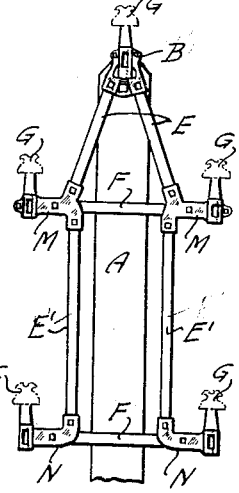
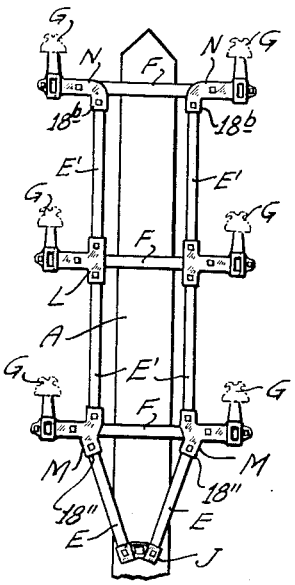
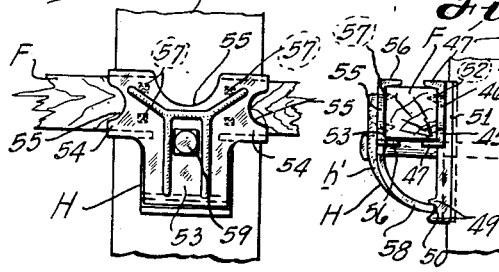
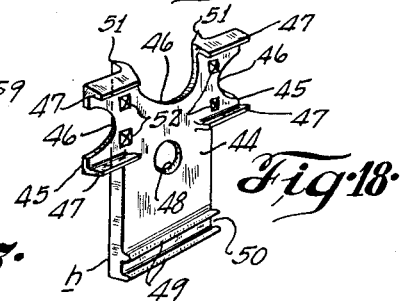
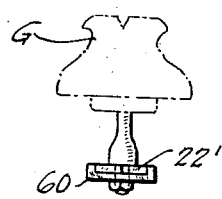
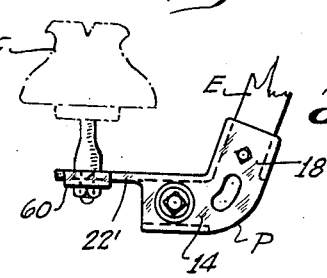
INVENTORS
Thomas T. Richards,
George McD. Johns,
Edsel K. Smith.
ATTORNEY Patented Oct. 6, 1936

2,056,366

UNITED STATES PATENT OFFICE 2,056,366

POLE-TOP FIXTURE

Thomas T. Richards, St. Louis, George McD. Johns, Sappington, and Edsel K. Smith, Richmond Heights, Mo., assignors to Smithjohns, Inc., St. Louis, Mo., a corporation of Missouri Application January 20, 1934, Serial No. 707,538

29 Claims. (Cl. 189—33)

This invention relates generally to electric pole-lines and, more particularly, to a certain new and useful improvement in the fixtures for supporting the lines upon the poles for transmission of light, power, and other electrical energy.

Our invention has for its chief object the provision of a fixture of the type and for the purpose stated which includes in its structure one or more pairs of struts or hangers, one or more cross-arms, and a plurality of brackets and clamps, which may co-operably be variously arranged and joined, whereby the fixture may selectively assume a wide variety of formations for safely and efficiently meeting the requirements of different service installations, the several parts or members of the fixture being not only readily and economically manufactured and durable in use, but also both co-operably assembled into the desired finished fixture and mounted on the pole with ease, convenience, and a minimum of labor and expense.

And with the above and other objects in view, our invention resides in the novel features of form, construction, arrangement, and combination of parts presently described and pointed out in the claims.

In the accompanying drawings,—

Figure 5 illustrates in enlarged elevation the inner face of one of the members forming part of one of the combined insulator-supporting and strut and pole-engaging brackets of the fixture of Figure 1;

Figure 6 is a vertical sectional view of the bracket-member of Figure 5, taken approximately on the line 6—6, Figure 5;

Figure 7 is an enlarged elevational view of one of the members forming part of the combined insulator-supporting and strut and cross-arm engaging brackets of the fixture of Figure 1, illustrating in detail the inner face thereof;

Figure 8 is an edge or side elevational view of the bracket-member of Figure 7;

Figure 9 is an enlarged elevational view of one of the members of a modified combined insulator-supporting and strut-engaging bracket forming part of the fixture of our invention;

Figure 10 is an elevational view of one of the members forming part of a modified combined pole and strut-engaging bracket comprised in our fixture;

Figure 1:
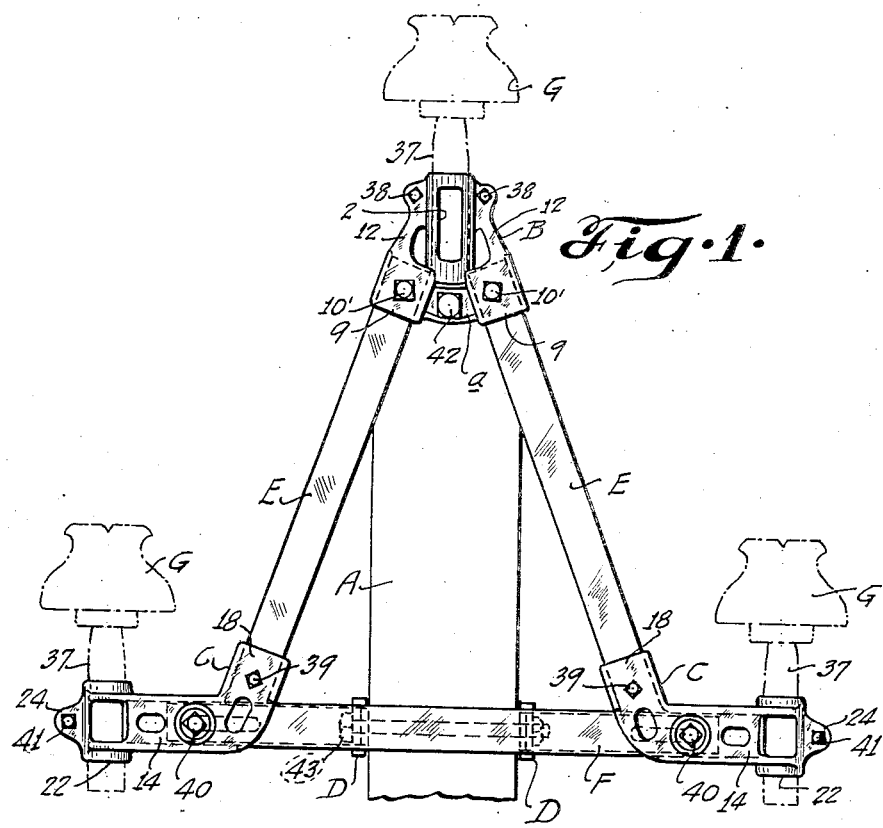
Figure 1 illustrates in elevation a pole-top fixture embodying one form of our invention in mounted or installed position on a pole.
Figure 3:
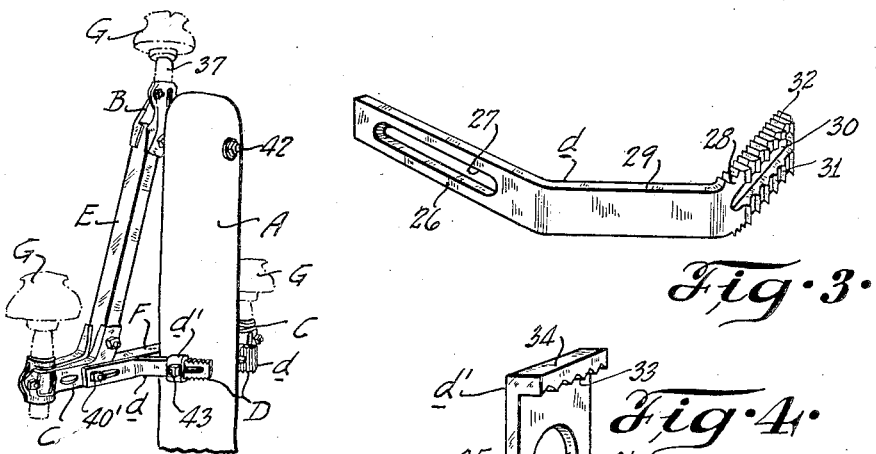
Figures 3 and 4 are enlarged perspective views of the co-operable members comprised in the pole-clamp of the fixture of Figure 1.

Figures 11, 12, 13, 14, and 15 are reduced elevational views of different forms of the fixture as modified to meet the requirements of various pole-lines;

Figure 16 is a front elevational view of a modified form of combined cross-arm and pole-engaging clamp of the fixture;

Figure 17 is a side elevational view of the cross-arm and pole-engaging clamp of Figure 16;

Figure 18 is a perspective view of one of the sections or members of the clamp of Figure 16; and Figures 19 and 20 are, respectively, side and end views of a modified form of combined insulator-supporting and strut-engaging bracket of the fixture.

Referring now more in detail and by reference characters to the drawings, which illustrate practical embodiments of our invention, A designates a pole preferably of wood, which, as is usual in pole-lines, is suitably embedded at an end in the ground.

B designates a combined insulator and hanger or strut-support or bracket, which includes co-operable or companion sections $b$, best seen in Figures 1, 5, and 6.

As shown, each section $b$ is in the form of a suitable casting integrally comprising a central longitudinally extending arcuate or so-called socket portion $l$ preferably longitudinally cut-away, as at $2$, for weight reducing purposes.

At the lower end, and disposed crosswise of the channel, of portion $l$, is a right-angularly rearwardly presented flange or wall $3$, depending from which, with its rear face $a$ in approximately the plane of the end-margins $b$ of socket-portion $l$, is a plate or wall $4$ apertured for bolt-accommodation, as at $5$, and whose lower margin has preferably a gentle curvature laterally of the casting, as best seen in Figure 5.

Projecting right-angularly forwardly from, and centrally registering with, the lower arched margin of wall $4$, is a forwardly projecting wall or flange $6$, which arcuately has a length somewhat greater than the breadth of wall $3$, and connecting the wall $6$ at its opposite outer ends with the opposite outer ends of wall $3$, are obliquely extending side walls or flanges $7$, $7$, the wall $4$ at its side margins being joined to the walls $6$ and $7$ by suitable fillets $7'$.

Projecting laterally in opposed relation from, and disposed adjacent the upper end of, the side or end margins $b$ of portion 1, are apertured ears 8, 8, and projecting laterally outwardly from the front margins of said side-walls 7, are approximately rectangular plates 9, 9, each centrally apertured, as at 10, and each formed on its inner face with a series of radial ribs or the like 11, for purposes presently appearing.

Joining the ears 8 with the upper margins of the respective plates 9, are obliquely longitudinally extending brace-strips 12, and projecting right-angularly rearwardly from, and extending along, the outer side margins of the plates 9, are flanges 13.

C designates an also combined insulator-support and hanger or strut-engaging member or bracket, which likewise includes co-operable or companion sections $c$, best seen in Figures 1, 7, and 8.

As shown, each section $c$ is similarly in the form of a suitable casting integrally comprising a body-portion 14 of generally oblong-rectangular contour provided upon its opposite longer side margins with right-angularly presented flanges 15, 15', the body-portion 14 intermediate the flanges 15 and preferably adjacent an end being formed with a bolt-aperture 16 and thereabout on its inner face, for purposes presently appearing, with a series of radial ribs 17.

At its end adjacent the aperture 16, the body-portion 14 is formed with an oblique angular extension 18, which is also provided with a bolt-opening 19 and thereabout also on its inner face with a series of radial ribs 20, the extension 18 being also provided upon its opposite side margins with right-angularly presented flanges 21, 21', the former of which is preferably an angular continuation of the body-portion flange 15. As will be seen, the flange 21' is, for purposes presently appearing, suitably spaced, as at 21", from the flange 15'.

At its opposite end, the body-portion 14 is formed with a right-angularly extending arcuate or socket portion 22 preferably cut-away, as at 23, for weight reduction, and formed upon its outer end-margin with an apertured ear 24. Preferably, it may be added, the body-portion 14 and its extension 18 are also preferably cut-away, as at 25, for weight reduction.

Co-operable with the brackets C, is a pole-engaging clamp D, which includes a pair of opposed clamping-members $d$, each of which, in turn, is preferably in the form of a casting integrally comprising a suitably elongated strip or portion 26 longitudinally slotted, as at 27, an arm 28 disposed at right angles to the strip 26, and an intermediate portion 29 disposed obliquely to, and joining, the strip 26 and arm 28. The arm 28 is also longitudinally slotted, as at 30, and formed upon its one or outer side face with a series of suitably spaced cross-teeth 31. Lengthwise upon its opposite side margins, the arm 28 is formed with serrations or teeth, as at 32, co-operable with which are corresponding serrations or teeth 33 formed upon the opposed inner faces of flanges 34 presented at right angles from the body-portion 35 of an arm-retaining member $d'$, the portion 35 being apertured, as at 36, for bolt-accommodation.

Figures 2, 4:
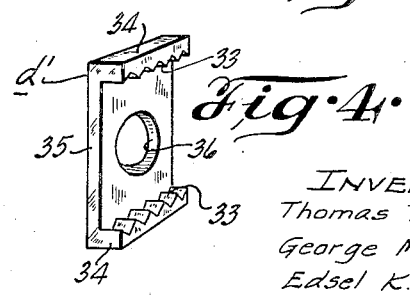
Figure 2 is a reduced perspective view of the mounted fixture as angularly seen from the rear.

Co-operable with the brackets B and C and pole-clamp D in completing the form of our fixture illustrated in Figures 1 and 2, are hangers or struts E and a cross-arm F, each of which is constructed preferably of wood or other suitable insulation material, and each of which is preferably rectangular in section and of dimensions to fit the portions or plates 9 of the brackets B and the body-portions 14 and their extensions 18 of the brackets C.

Hence, in use and operation, and in assembling the several members in fixture-completing relation, a pair of the bracket-sections $b$ are disposed at their plates 9 in opposed relation flatwise upon the ends of respective hangers or struts E and securely bolted detachably thereto by suitable fastening-members 10' passed through the struts E and the apertures 10 of the opposed sections $b$.

At or about the same time, a suitable insulator G is disposed at its cylindrical stem or shank 37 in the socket formed by the arcuate portions 1, and the sections $b$ further secured together in gripping relation with the struts E and insulator G by suitable bolts 38 passed through the apertures of, and engaging, the opposed and now flatwise abutting ears 8.

A pair of the bracket-sections $c$ are, in turn, disposed at their extensions 18 in opposed relation flatwise upon the lower ends of the respective struts E and rigidly secured detachably thereto by bolts 39 passed through the bolt-openings 19 and the interposed struts E.

At or about the same time, a cross-arm F is disposed with its opposite ends between the flanges or jaws 15, 15', of the respective pairs of sections $c$ and engaged by the ribbed body-portions 14 thereof, the bracket-sections $c$ being further secured together and the arm F being secured to the brackets C by bolts 40 passed through the openings 16 and the interposed end-portions of the cross-arm F.

Also at or about the same time, other insulators G are disposed at their respective shanks 37 in the sockets formed by the arcuate end-portions 22 of the bracket-sections $c$ and said sections $c$ additionally secured together in gripping relation with the struts E, cross-arm F, and insulators G by bolts 41 passed through the apertures of and engaging the now flatwise registering ears 24.

The assembled fixture is now disposed at the desired elevation on the pole A and securely suspended or mounted detachably upon a side thereof by means of a through-bolt 42 passed through the registering bolt-openings 5 of bracket-sections $b$ and through the pole A, as best seen in Figures 1 and 2.

The clamp-sections $d$ are now, in turn, fitted at their toothed arms 28 against diametrically opposite faces of pole A and at their strips 26 in registration with the body-portions 14 of the respective bracket-sections $c$ and engaged adjustably at their slots 27 upon the projecting shank-ends of the bolts 40, the nuts 40' of bolts 40 being then threaded down for fastening the clamps $d$ securely in adjusted position to the brackets C and cross-arm F. Retaining members $d'$ are then fitted at their toothed flanges 34 upon the toothed arms 28 and a bolt 43 projected through the then registering openings 36 and slots 30 of the respective arms 28 and members $d'$ and the interposed pole A.

Thus the fixture is, in a convenient, facile manner, mounted at the desired location detachably upon the pole A. It will be understood that the several bracket and clamp-sections may vary in dimensions and that the struts and cross-arm may not only vary accordingly in cross-section, but also in length to meet the requirements of different pole lines, and it is to be observed that the retainer members $d'$, through and by the engagement of their teeth 33 with the teeth 32 of the arms 28, will continue to function in retaining the arms 28 in adjusted location on the pole A notwithstanding accidental loosening of the bolt 43.

If desired, and particularly on high voltage lines where full wood insulation between all phases is essential as a safety-factor, the fixture may at its cross-arm F be fastened to the pole A by a modified clamp H, in lieu of the clamp D. Such modified clamp H is best seen in Figures 16, 17, and 18, and as there shown comprises a main section h, which is in the form of a casting integrally comprising a body or plate-portion 44 of oblong rectangular contour provided at or adjacent its one or upper end with lateral extensions 45, the plate 44 and its extensions 45 being preferably cut-away, as at 46, for weight reduction. Extending laterally of the plate 45 and projecting right-angularly forwardly from and along the opposite side margins of the arms or extensions 45, are correspondingly spaced flanges or jaws 47, whereby the clamp-section h is engageable with the cross-arm F, as best seen in Figure 17. Within its area, the plate 44 is formed with a bolt-opening 48, and extending crosswise of the plate 44 at its lower end and upon its outer face, are suitably spaced ribs 49 providing a groove therebetween, as at 50, for purposes shortly appearing. Upon its rear face and along its opposite longitudinal margins, the plate 44 is formed with pole-engaging ribs 51, and upon its front face intermediate the flanges 47, the plate 44 is formed with arm-engaging prongs or protuberances 52.

Co-operable with the section h, is a companion section h', which also is in the form of a casting integrally comprising a body-portion 53 provided with lateral extensions 54, the body-portion 53 and arms 54 being similarly cut-away, as at 55, for weight reduction. Extending laterally of the body-portion 53 and projecting right-angularly rearwardly from and along the opposite side margins of the arms or extensions 54, are correspondingly spaced flanges or jaws 56 for engaging the cross-arm F in opposite or opposed relation to the jaws 47 of section h, the body-portion 53 being also provided on its rear face intermediate the jaws 56 with like arm-engaging prongs or protuberances, as at 57. Within its area and for registration with bolt-opening 48, the body-portion 53 is provided with a suitable bolt-opening, and depending from the body-portion 53, is a tail-portion 58 of suitable curvature for snugly fitting at its lower end in the groove 50 when the sections h, h', are mounted as described on the cross-arm F.

And to secure the clamp H and its engaged cross-arm F detachably to and upon the pole A, a through-bolt 59 is passed or projected through the registering bolt-openings of the clamp-sections h, h', and transversely through the pole A, as shown, at right angles to the bolt 42

And, again, in other lines, it may be desirable to selectively employ the combined strut-support and pole-engaging bracket J, best seen in Figures 10 and 11. As shown, the bracket J comprises opposed companion sections j, each being preferably in the form of a casting approximately similar in structure to the lower portion of the section b, the arcuate upper portion 1, ears 8, and connecting-straps 12 being removed or omitted, that is to say, each section j integrally includes a central or intermediate marginally flanged plate or wall 4' apertured for bolt-accommodation, as at 5', and approximately rectangular plates 9' projecting laterally and obliquely outwardly from opposite sides of the plate 4', the plates 9' being each similarly centrally apertured, as at 10', formed on its inner face with a series of strut-engaging radial ribs 11', and provided along its outer side margin with a lateral right-angularly presented flange or jaw 13'.

Then, further, in still other lines, it may be desirable to selectively employ either or both the modified combined cross-arm engaging and insulator-supporting brackets K and/or L, best seen in Figures 9, 12, and 15.

As there shown, the bracket K comprises opposed companion sections each being preferably in the form of a casting approximately similar in structure to the casting c, the flanged extension 18 thereof, however, being removed or omitted; while bracket L comprises opposed companion sections each being preferably in the form of a casting likewise approximately similar in structure to the casting c, a flanged extension 18', shown in dot-dash lines in Figure 9, in the form of a T-head extending right-angularly to the body-portion of the casting being substituted for the extension 18 for connecting engagement with vertically or end-to-end disposed struts E', as shown in Figure 15.

To meet the conditions of even other lines, we further provide an additional combined insulator-supporting and strut and cross-arm engaging bracket M, best seen in Figures 14 and 15, which is structurally substantially similar to the bracket L, with the exception that one portion of the head 18" extends somewhat obliquely to the body-portion for corresponding engagement with an obliquely disposed strut E, as shown; while other brackets N, also seen in Figures 14 and 15, are further structurally identical with the brackets C, except that their respective extensions 18$^b$ project approximately at right-angles to the body-portions thereof for corresponding engagement with vertically disposed struts E'.

The conditions of other lines may require the employment of still another modified combined insulator-supporting and strut and cross-arm engaging bracket P, best seen in Figures 19 and 20, which is also substantially identical with the bracket C, except that the companion notched strips 22' are substituted for the arcuate or socket portions 22, the strips 22', in insulator-supporting relation, being further clamped or secured together by a suitable flanged retaining-member 60, as shown.

Thus our fixture is exceedingly flexible or elastic for efficiently meeting the conditions, voltage, and requirements of various types of lines. For instance, Figure 1 illustrates the fixture equipped for three lines and made up of the brackets B and C, clamp D, struts E, and cross-arm F, as fully and in detail described.

Figure 11 illustrates the fixture equipped for two lines and made up of the brackets J and C, struts E, and arm F, mounted on the pole A with the brackets J and C reversed to meet service conditions, and, while not shown, the fixture being further secured to the pole by either a clamp D or H.

Figure 12 illustrates the fixture equipped for two lines and made up merely of a cross-arm F and brackets K and selectively, while not shown, a pole-clamp D or H.

Figure 13 shows the fixture in connection with five lines and made up of a bracket B, two pairs of the brackets C, struts E, and a single cross-arm F, and also selectively, while not shown, a clamp D or H, and it may be observed that the angular interruption or space 21″ between the flanges 15′ and 21′, best seen in Figure 7, conveniently permits of the arrangement of two pairs of the brackets C upon and in engagement with a single pair of struts E.

Figure 14 illustrates the fixture also in connection with five lines and made up of a bracket B, a pair of modified brackets M, a pair of modified brackets N, a pair of oblique struts E, a pair of vertical struts E′, two cross-arms F, and also selectively, while not shown, one or more of the clamps D or H, the extensions 18ᵇ of the brackets N being upwardly presented for connection with the struts E′.

And Figure 15 illustrates the fixture flexibly or selectively extended for six lines and accordingly made up of respective pairs of the brackets N, L, and M, aligning pairs of vertically extending struts E′, a pair of oblique struts E, a pole-engaging bracket J, and also selectively, while not shown, one or more of either clamps D or H, the extension 18ᵇ of the upper brackets N being downwardly presented for engagement with the depending struts E′.

In either such installation, the fixture may be readily assembled and equally readily mounted at the desired location on the pole, the oppositely disposed through-bolts 42 and 43 requiring pole drilling only and strengthening the pole-top. The several brackets of the fixture may be economically manufactured and afford maximum resistance to line pull in any direction, while the wooden struts and cross-arms increase the safety factor for live line work. Further, either of the clamps D or H facilely enable the mounting of the fixture on poles of different diameter, and the ribbed or pronged surfaces of the several brackets not only increase the rigidity between the engaged parts, but the strains between the wooden struts and cross-arm are to a large extent absorbed thereby and correspondingly removed from the holding bolts.

It will be understood that the fixture may be additionally varied to meet the requirements of other pole-lines, and that changes in the form, construction, arrangement, and combination of the several parts of the fixture may be made and substituted for those herein shown and described without departing from the nature and principle of our invention.

Having thus described our invention, what we claim and desire to secure by Letters Patent is,—

1. In a pole-line fixture, a two-part bracket comprising opposed companion sections each having a lower central portion apertured for bolt-accommodation for attaching the fixture to a pole, bolt-apertured lateral portions marginally flanged for strut engagement, and an upwardly presented arcuate socket-forming portion for insulator-support.

2. In a pole-line fixture, a bracket comprising opposed companion sections each including a body-portion marginally flanged along its opposite side margins for embracing a cross-arm, each body-portion being lengthwise extended at an end and said extensions having inwardly presented faces for co-operably in opposed relation clampwise gripping the shank of an interposed insulator-support.

3. In a pole-line fixture, a bracket comprising opposed companion sections each including a body-portion marginally flanged along its opposite side margins for embracing a cross-arm, each body-portion being lengthwise extended at an end and said extensions having inwardly presented arcuate faces for co-operably in opposed relation providing a socket for accommodating an insulator-support.

4. In a pole-line fixture, a bracket comprising opposed companion sections each including an intermediate marginally flanged body-portion for embracing a cross-arm, a marginally flanged extension projecting angularly from one end of the body-portion for embracing a correspondingly presented strut, and an arcuate socket-providing extension projecting for insulator-support from the opposite end of the body-portion.

5. In a pole-line fixture, a cross-arm, and means including a clamp for attaching the cross-arm upon a pole, the clamp comprising companion sections each including a slotted strip for adjustable bolted connection to the cross-arm, a slotted arm for adjustable bolted connection with the pole, and an intermediate portion angularly connecting the strip and arm.

6. A pole-line fixture including, in combination with the pole, a pair of struts spaced at their ends and extending substantially lengthwise of the pole, a cross-arm angularly disposed to the struts and pole, and means comprising a plurality of brackets for securing the cross-arm to the struts and the struts to the pole, each of said brackets including opposed companion sections, the sections of one bracket having embracing relation with both struts and the sections of the remaining brackets having embracing relation with the cross-arm and the respective struts.

7. A pole-line fixture including, in combination with the pole, a pair of struts spaced at their ends and extending substantially lengthwise of the pole, a cross-arm angularly disposed to the struts and pole, and means comprising a plurality of brackets for securing the cross-arm to the struts and the struts to the pole, each of said brackets including opposed companion sections, the sections of one bracket having correspondingly spaced portions for embracing relation with both struts and the sections of the remaining brackets having angular extensions for embracing relation with the cross-arm and the respective struts.

8. A pole-line fixture including, in combination with the pole, a pair of struts spaced at their ends and extending substantially lengthwise of the pole, a cross-arm angularly disposed to the struts and pole, a plurality of brackets each including opposed companion sections, the sections of one bracket having embracing relation with both struts and the sections of the remaining brackets having embracing relation with the cross-arm and the respective struts, means for securing said one bracket-sections together and to the pole and struts, and other means for securing the sections of the remaining brackets respectively together and to the embraced struts and cross-arm.

9. A pole-line fixture including, in combination with the pole, a pair of struts spaced at their ends and extending generally lengthwise of the pole, a bracket comprising a pair of opposed companion sections each consisting of a pole-engaging body-portion and outwardly presented extensions, the latter for embracing relation with both struts, means engaging said section body-portions and the pole for fastening said sections together and the embraced struts conjointly to and upon a side of the pole, a cross-arm angularly disposed to the struts and pole, a pair of brackets each also comprising a pair of opposed companion sections having correspondingly angularly extending portions for embracing relation with the cross-arm and the respective struts, and means engaging said latter bracket sections and the embraced arm and struts for securing the same together.

10. A pole-line fixture including, in combination with the pole, a pair of struts spaced at their ends and lengthwise extending in obliquely diverging relation to the pole, a cross-arm angularly disposed to the struts and pole, a bracket comprising companion sections having correspondingly diverging angular portions for embracing the respective struts for conjointly fastening the same to and upon the pole, and additional brackets each also including companion sections also having diverging angular extensions for embracing connection with the cross-arm and the respective struts.

11. A pole-line fixture including, in combination with the pole, a plurality of pairs of struts, the struts of each pair extending in spaced relation substantially lengthwise of the pole, a plurality of cross-arms angularly disposed to the struts and pole, a plurality of brackets, one of said brackets comprising companion sections for embracing relation with a particular pair of struts for conjointly fastening the same to the pole, others of said brackets having embracing relation with a cross-arm and another pair of said struts, and others of said brackets having embracing relation with a second cross-arm and with the respective struts of each pair, and respective means for securing respective brackets to the pole, the struts, and the cross-arms.

12. In a pole-line fixture, a plurality of pairs of struts, the struts of each pair extending in spaced relation, a cross-arm angularly disposed to, and intermediate the pairs of, struts, and means comprising a plurality of brackets each comprising companion sections having oppositely presented extensions for embracing relation with the cross-arm and the respective struts for conjointly fastening the latter to the cross-arm.

13. A pole-line fixture including, in combination, a pair of struts spaced at their ends and extending generally lengthwise of the pole, a cross-arm angularly disposed to the struts and pole, a bracket comprising opposed companion sections each consisting of a body-portion having outwardly presented and laterally flanged extensions for embracing the respective struts, a fastening bolt engaging the respective bracket body-portions and the pole for conjointly securing the struts to the pole, additional brackets each also comprising opposed laterally flanged sections having angularly presented and correspondingly laterally flanged extensions for embracing relation with the cross-arm and respective struts, and bolts engaging said respective companion sections, their extensions, and the embraced arm and strut for fastening the same together.

14. A pole-line fixture including, in combination with the pole, a pair of struts spaced at their ends and extending substantially lengthwise of the pole, and means comprising a bracket consisting of a pair of marginally flanged companion sections having embracing engagement in opposed registering relation with both struts for conjointly securing the same to the pole.

15. In a pole-line fixture, in combination with the pole, a pair of struts spaced at their ends and generally extending lengthwise of the pole, and means for conjointly supporting the struts on the pole, said means comprising a bracket including opposed companion sections each consisting of a pole-engaging body-portion having laterally flanged plates oppositely extending outwardly from the body-portion for strut-embracement, and a fastening member engaging the pole and the opposed body-portions of said sections.

16. In a pole-line fixture, in combination with the pole, a pair of struts spaced at their ends and extending lengthwise in obliquely diverging relation to the pole, and means for conjointly supporting the struts on the pole, said means comprising a bracket including opposed companion sections each consisting of a pole-engaging body-portion having laterally flanged plates oppositely extending outwardly in correspondingly diverging relation from the body-portion for strut-embracement, and a fastening-member engaging the pole and the body-portions of said sections.

17. In a pole-line fixture, in combination with the pole, a pair of struts spaced at their ends and extending lengthwise in obliquely diverging relation to the pole, a bracket comprising a pair of opposed companion sections each including a body-portion having correspondingly diverging marginally flanged plate extensions for clampwise embracing both struts, said intermediate body-portions having registering openings for bolt-accommodation, and a bolt projected through said openings and engaging the pole for attachment of the bracket to and upon a side of the pole.

18. In a pole-line fixture, in combination with the pole, a pair of struts spaced at their ends and generally extending lengthwise of the pole, and means for conjointly supporting the struts on the pole, said means comprising a bracket including opposed companion sections each consisting of a pole-engaging body-portion having marginally flanged plate-extensions oppositely projecting outwardly from the body-portion for strut-embracement, a bolt engaging the body-portions of both sections for fastening the bracket to the pole, and other bolts engaging the respective bracket-sections and the embraced struts.

19. A pole-line fixture including, in combination with the pole, a pair of struts spaced at an end and extending in lengthwise relation to the pole, a cross-arm angularly disposed to the struts and pole, and means comprising a plurality of brackets each including opposed companion sections having angular extensions for clampwise embracing the cross-arm and the respective struts for connecting the struts and cross-arm for attachment to the pole.

20. A pole-line fixture including, in combination with the pole, a pair of struts spaced at an end and extending generally lengthwise of the pole, a cross-arm angularly disposed to the struts and pole, a plurality of brackets each comprising opposed companion sections each consisting of a marginally flanged body-portion having a marginally flanged angular extension for clampwise embracing the cross-arm and respective struts and cross-arm, and fastening bolts engaging the respective bracket body-portions, the struts, and the cross-arm for attachment of the struts and the arm to the pole.

21. A pole-line fixture including, in combination with the pole, a pair of struts spaced at an end and extending in lengthwise relation to the pole, a cross-arm angularly disposed to the struts and pole, means comprising a plurality of brackets each including opposed companion sections having angular extensions for clampwise embracing the cross-arm and the respective struts for connecting the struts and cross-arm, and means for clampwise securing the cross-arm to the pole.

22. A pole-line fixture including, in combination with the pole, a pair of struts spaced at an end and extending generally lengthwise of the pole, a cross-arm angularly disposed to the struts and pole, a plurality of brackets each comprising opposed companion sections each consisting of a marginally flanged body-portion having a marginally flanged angular extension for clampwise embracing the cross-arm and respective struts and cross-arm, means including opposed clamping-arms for securing the cross-arm to the pole, and fastening-bolts engaging the respective bracket body-portions, the struts, the cross-arm, and some of the clamping-arms.

23. A pole-line fixture including, in combination with the pole, a pair of struts spaced at their ends and extending substantially lengthwise of the pole, a cross-arm angularly disposed to the struts and pole, a bracket having connection with both the struts, means for securing said bracket to the pole, other brackets having engagement with the cross-arm and the respective struts, and securing means having connection with the pole and said other brackets.

24. A pole-line fixture including a securing-bracket comprising opposed companion sections for clampwise embracing an interposed member, and extensions on said sections having opposed faces for co-operably gripping the shank of an interposed insulator-support.

25. A pole-line fixture including a securing-bracket comprising opposed companion sections for clampwise embracing an interposed member, and extensions on said sections having inwardly presented arcuate faces for co-operably in opposed relation gripping the shank of an interposed insulator-support.

26. A pole-line fixture including a securing-bracket comprising opposed companion sections for clampwise embracing an interposed member, extensions on said sections having inwardly presented arcuate faces for co-operably in opposed relation gripping the shank of an interposed insulator-support, and means for securing said sections and their said extensions together in clampwise engagement with the interposed member and the insulator-support.

27. In a pole-line fixture, an attaching bracket comprising opposed companion sections having registering central apertured portions for bolt-connection with a pole and oppositely outwardly presented marginally flanged plate-portions for co-operably embracing a pair of spaced struts.

28. In a pole-line fixture, an attaching bracket comprising opposed companion sections each including a marginally flanged body-portion having a marginally flanged angularly projecting extension for clampwise engaging an interposed cross-arm and a strut angularly presented to the cross-arm, both said body-portions and extensions being apertured for accommodating fastening-bolts.

29. In a pole-line fixture, an attaching bracket comprising opposed companion sections each including a marginally flanged body-portion having marginally flanged extensions angularly diverging from the body-portion for clampwise engaging an interposed cross-arm and angularly presented struts, both said body-portions and extensions being apertured for accommodating fastening-bolts.

THOMAS T. RICHARDS.
GEORGE McD. JOHNS.
EDSEL K. SMITH.